US012637120B2

(12) United States Patent
Pröll

(10) Patent No.: US 12,637,120 B2
(45) Date of Patent: May 26, 2026

(54) ARRANGEMENT AND METHOD FOR OPTICALLY CAPTURING A TRACK

(71) Applicant: PLASSER & THEURER, EXPORT VON BAHNBAUMASCHINEN, GESELLSCHAFT M.B.H., Vienna (AT)

(72) Inventor: Markus Pröll, Linz (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 194 days.

(21) Appl. No.: 18/565,636

(22) PCT Filed: May 25, 2022

(86) PCT No.: PCT/EP2022/064181
§ 371 (c)(1),
(2) Date: Nov. 30, 2023

(87) PCT Pub. No.: WO2022/253660
PCT Pub. Date: Dec. 8, 2022

(65) Prior Publication Data
US 2024/0270293 A1      Aug. 15, 2024

(30) Foreign Application Priority Data

May 31, 2021    (AT) .............................. A 50436/2021

(51) Int. Cl.
*G06V 20/00*          (2022.01)
*B61K 9/08*          (2006.01)
(Continued)

(52) U.S. Cl.
CPC ............... *B61K 9/08* (2013.01); *H04N 23/64* (2023.01); *H04N 23/95* (2023.01); *G06V 20/588* (2022.01)

(58) Field of Classification Search
CPC .......... B61K 9/08; H04N 23/64; H04N 23/95; G06V 20/588; B61L 23/042; B61L 23/04
See application file for complete search history.

(56) References Cited

U.S. PATENT DOCUMENTS 10,063,837 B2 * 8/2018 Zoken .................. H04N 13/221
10,859,468 B2 * 12/2020 Taylor ................. G01M 17/027
(Continued)

FOREIGN PATENT DOCUMENTS

AT          518692 A1    12/2017
DE         10256123 A1    6/2004
(Continued)

*Primary Examiner* — Frank F Huang
(74) *Attorney, Agent, or Firm* — Laurence A. Greenberg; Werner H. Stemer; Ralph E. Locher

(57) ABSTRACT

An arrangement for optically capturing a railroad track includes a carrier device, a camera, and two light sources. The arrangement is mountable on a carrier vehicle that is movable on rails. The alignment of the two light sources and thus the central axes of the emitted light radiation or waves enclose an acute angle with a longitudinal axis of the rail. The light sources are coupled with the camera via control signal lines. The triggering or activation of the light sources is effected via the control signal lines by a predefined control signal. This achieves detailed, sharp image contours that allow high-precision image evaluation and object recognition at the highest possible working speed.

16 Claims, 1 Drawing Sheet

(51) Int. Cl.
    *H04N 23/60*     (2023.01)
    *H04N 23/95*     (2023.01)
    *G06V 20/56*     (2022.01)

(56)           References Cited

U.S. PATENT DOCUMENTS

| | | |
|---|---|---|
| 11,255,055 B2 | 2/2022 | Buerger et al. |
| 2013/0070083 A1 | 3/2013 | Snead |
| 2018/0222499 A1* | 8/2018 | Gomes .................... G06V 20/52 |
| 2018/0237041 A1* | 8/2018 | Mesher ................... G06T 7/001 |
| 2018/0339720 A1 | 11/2018 | Singh |
| 2019/0113356 A1* | 4/2019 | Fowe ................... G08G 1/0145 |
| 2019/0285421 A1* | 9/2019 | Johnston ................ G01C 21/32 |
| 2020/0031281 A1* | 1/2020 | Watanabe ............ H04N 13/111 |
| 2020/0072631 A1* | 3/2020 | Fowe ...................... G08G 1/052 |
| 2020/0073966 A1* | 3/2020 | Fowe ................... G06F 16/285 |
| 2020/0158656 A1* | 5/2020 | Chung ................. G06T 7/0004 |
| 2020/0186778 A1* | 6/2020 | Meyer ................. H04N 13/189 |
| 2020/0292331 A1* | 9/2020 | Rabel ................... G06F 16/909 |
| 2020/0349743 A1* | 11/2020 | Kitamura .............. H04N 7/181 |
| 2021/0146974 A1* | 5/2021 | Wang ................ H04B 7/06952 |

FOREIGN PATENT DOCUMENTS

| | | | |
|---|---|---|---|
| EP | 2343496 A1 | 7/2011 | |
| EP | 3088274 A1 | 11/2016 | |
| JP | H06322707 A | 11/1994 | |
| JP | H10332324 A | 12/1998 | |
| WO | 2006004846 A2 | 1/2006 | |
| WO | 2019023658 A1 | 1/2019 | |

* cited by examiner

ARRANGEMENT AND METHOD FOR OPTICALLY CAPTURING A TRACK

FIELD OF TECHNOLOGY

The invention relates to an arrangement for optically capturing a track, comprising a carrier device, a camera, and two light sources, with this arrangement being attachable on a carrier vehicle movable on rails. The invention further relates to a method for operating the arrangement.

PRIOR ART

In modern, automated image capture and image evaluation with focus on object recognition, a wide range of procedures and methods are used. The principle of optical object capture using dark-field illumination is known. To capture an object quickly and with high contrast using a camera, light is radiated flatly through a light source. On the surface of the object, irregularities—these can be elevations as well as depressions, for example defects, oblique edges, embossings and the like—disrupt the beam path of the light. This deliberately generates shadows that are important for a downstream image evaluation and object recognition. Due to an almost parallel alignment of the light radiation to the object to be recorded, the light is only refracted accordingly at the edges and reflected to the camera. This refraction of light leads to a dark image background, against which the structures to be observed stand out brightly. High-contrast images are created, irregularities are emphasized. In known applications, cameras with one colour channel and one light source are usually used.

A method and a system for maintaining a track for rail vehicles is disclosed in AT 518692 A1 of the applicant. The measuring system described therein comprises laser line scanners 14 arranged above each rail 6 in order to capture the shape of the respective rail surface. This is also to capture other features such as rolling marks, sleeper embossings, rail fastenings, etc. In the method mentioned, a so-called 3D point cloud is generated from the captured objects by means of laser line scanners. By means of corresponding calculation and evaluation algorithms, conclusions can be drawn from the data of the 3D point cloud about the geometry and condition of the captured track.

SUMMARY OF THE INVENTION

The object of the invention is to provide an arrangement of the kind mentioned above with an improvement compared to prior art in such a way as to increase the performance and thus the track length to be captured per unit of time. In addition, the work for capturing tracks can be carried out during shorter track possessions with higher quality of the data and image material gained. A further object of the invention is to indicate a corresponding method for operating the arrangement.

According to the invention, these objects are achieved by way of an arrangement with the features as claimed and a method according to the features as claimed. Dependent claims indicate advantageous embodiments of the invention.

It is provided that the alignment of the two light sources and thus the centre axes of the emitted light radiation or waves enclose an acute angle ($\beta1$, $\beta2$) with a longitudinal axis of the rail, that the light sources are coupled with the camera via control signal lines, and that triggering or activation of the light sources via the control signal lines by means of a predefined control signal is provided.

By aligning the two light sources at an acute angle $\beta1$ and $\beta2$, which is as small as possible in relation to the longitudinal axis of the rail and adapted to the given frame and design conditions, the greatest possible shadow generation on rail rolling marks, inscriptions, and other motifs to be captured is available. This is a prerequisite for a later, high-precision image evaluation and object recognition at high working speeds. The largest possible shadow would be obtained if the light sources are aligned parallel to the respective rail in its immediate vicinity and the angles $\beta1$, $\beta2$ equal zero. However, in order to comply with the usable structure gauge specified by the infrastructure manager and to prevent a collision with objects on the track, such a spatial arrangement is ruled out.

Together, the two light sources form a pair and are symmetrically arranged in relation to an orthogonal to the longitudinal axis of the rail. This results in the respective, opposite opening directions of the angles $\beta1$ and $\beta2$, which are consequently also symmetrical in relation to the orthogonal to the longitudinal axis of the rail. In order to be able to capture the entire lateral rail contour and the adjacent areas, a pair of light sources is arranged around a camera on both sides of each line of rails. For better comprehension, reference is also made to FIGS. 2 and 3. In addition to rail rolling marks, embossings, letterings, rail fastenings, fastening material, and rail joints can be captured. The latter are usually designed as welded joints or as non-welded, multi-part fish-plate connections.

By coupling the two light sources with the camera via control signal lines, a triggering of the light sources while the camera captures images simultaneously via a predefined control signal is ensured. The control signal is set up as distance-based information, e.g. one pulse per 25 cm of travelled distance. Alternatively, the control signal may be a time signal, e.g. with a frequency of 160 Hz. This enables optimal exposure and detailed image contours at very short shutter speeds/exposure times of the camera. With the current state of technology, working speeds and thus capturing speeds of 100 km/h and more are executable.

It is advantageous if the camera, seen in the direction of the longitudinal axis of the rail, is arranged approximately centrally between the light sources, that a camera axis is aligned approximately orthogonally to the longitudinal axis of the rail, and that an acute angle ($\alpha1$, $\alpha2$) is enclosed between the centre axes of the light sources and the horizontal ground plane.

With the camera aligned centrally between the two light sources, the shadows cast by elevated/depressed structures on the motif to be captured become visible by varying intensity. Due to the additional inclination of the light sources by the angles $\alpha1$ and $\alpha2$, there is an additional, third angle in the shadow cast tilting downwards in the direction of the rail foot in addition to the shadows mentioned above.

Additionally, it is advantageous that the camera is designed as an RGB video camera with three colour channels: red, green, and blue.

This enables separate capturing and accessing of the image data of the individual colour channels. This produces a grayscale image for each of the three colour spectra red, green, and blue. With digital image processing in the RGB colour space, this means 8 bits per channel, therefore a total maximum colour depth of 3×8 bits=24 bits for all colour channels. For the disclosed invention, it is useful here to access the image information of two colour channels that are matched with the emitted light radiation, particularly with the two different wavelengths of the two light sources. Compared to known methods with several cameras used, the use of three or two separate colour channels from only one camera is of great advantage, as a synchronization of the channels is obsolete. In contrast, three independent cameras with only one channel output require a complex synchronization of the image contents.

One embodiment of the invention provides that the camera, in particular the camera lens, is assigned an optical colour filter which only allows a defined range or defined sub-ranges of the optical spectrum or a defined bandwidth of a wavelength range of the incident light to enter the optics of the camera.

The colour filters, also known as front-lens filters, are also matched to the two wavelengths of the light sources used. In addition to the matching of the wavelength of the emitted light of the two light sources with the colour channels of the RGB camera already explained above, this results in a significant improvement of the light/shadow ratio. The incidence of unwanted light spectrum and stray light, such as sunlight or artificially generated working light, is thus largely prevented. This colour filter may also be designed as a multiple-action combination filter or staggered in series to allow a combination of different wavelengths to pass through unhindered, for example, red and green or red and blue.

It is also advantageous if a device for generating a so-called air curtain, in particular a uniform airflow, is arranged in front of the camera.

This guarantees high-quality image material without interference due to particularly low susceptibility to external weather conditions, such as splashing water, particle accumulation, and other contamination.

It is provided that the light sources are designed as LED light sources. LED luminaire technology is characterized by a very robust, durable design while having a high radiant power.

The light sources are activated in a clocked manner via the control signal, similar to a flashlamp. The activation frequency is between 160 and 200 Hz. Higher frequencies are also possible during operation. A clocked flashing/triggering of the light sources in this frequency range cannot be perceived by the human eye. The frequency for activating the light sources is matched to the camera in order to achieve the desired exposure time. A high luminous flux as well as the high luminous intensity of the LED light sources enable a high relative speed between the moved camera and the stationary track without any losses in the quality and sharpness of the image captures, even when exposure times are very short. Another advantage is that extraneous light, e.g. solar radiation, can also be largely masked due to a high light intensity.

A useful variant of the invention provides that each light source has a respective predefined, fixed wavelength and thus a corresponding colour spectrum.

To make it easier to match the light sources to the camera, it is useful if the two light sources each emit light radiation in a specific wavelength or also in specific spectral ranges. For this application, these LED light sources are thus subject to a precisely defined specification, which flows directly into the procurement process. For example, for capturing and evaluating image information via the red colour channel of the camera, it is advantageous for the generation of shadows if a light source with a wavelength of about 660 nm is installed. Light radiation with this wavelength is perceived by the human eye as the colour red. Furthermore, the colours blue with a wavelength of about 460 nm and green with a wavelength of about 530 nm can be quantified.

In a further development of the invention, it is provided that the camera is coupled with a computing unit, and this has an integrated internal memory.

This ensures a direct transmission of the data, particularly the image information. Depending on the specification, the computing unit is used to feed the processing and evaluation algorithms or for storage and buffering for later processing.

In the method according to the invention for operating the arrangement, the camera as well as the light sources are activated at the beginning of a work process, with the light sources being triggered synchronously by means of the control signal provided and, at the same time, the track point to be captured is recorded by the camera, and the image data obtained therefrom is recorded by a computing unit.

Due to the shared activation of the light sources as well as the camera via a control signal, an optical capture of the track with the best possible illumination and shortest exposure times is achieved. The flash-like, clocked activation of the light sources enables maximum luminous efficacy without overloading or even damaging the light sources.

It is advantageous if the image data captured by the computing unit are stored in a buffer memory for later or time-delayed use, or are read in directly by the computing unit for further processing.

This enables a flexible access to a wide range of processing, evaluation, and assessment processes for the captured image data. During operation, depending on the task, sequence, and requirement of the activity, data processing on the respective carrier vehicle is possible in almost real time or at another time, for example after completion of operation, at any location with access to the memory of the computing unit. The captured image data and information can also be transferred to other stationary computing units, as well as mobile notebooks, for easy viewing or extensive evaluation also using common interfaces.

It is also advantageous that the image data read into the computing unit, i.e. raw data from the camera, are separated into the individual colour channels, with the image data or image information contained therein of two colour channels, preferably the colour channels red and green, or red and blue, then being subtracted from each other.

Since the camera, preferably an RGB camera, outputs the colours (red, green, blue) as a total image signal, by separating the RGB colour information into the three individual channels, one image each of the associated colour space is obtained.

Image 1 with the image contents of the red light (wavelength ~660 nm)

Image 2 with the image contents of the green light (wavelength ~530 nm)

Image 3 with the image contents of the blue light (wavelength ~460 nm)

For the application according to the invention with two light sources, which are defined in the emitting colouring as red and green, this means:

Image 1 with image contents generated by the red light source, particularly the shadow cast by the red light source Image 2 with image contents generated by the green light source, particularly the shadow cast by the green light source The same applies to two light sources defined as red and blue:

Image 1 with image content generated by the red light source, particularly the shadow cast by the red light source Image 2 with image contents generated by the blue light source, particularly the shadow cast by the blue light source For each recording time of the camera, these two images explained are subtracted in the computing unit in order to clearly show the shadows and the contours. Using two colour channels according to the invention, and thus the image information contained therein of two differently generated shadows, which are generated from two approximately opposite directions, provides a doubling of the image information relevant for further utilization. In this way, after subtraction, particularly high-contrast image material is obtained with a pronounced relief representation of the captured object on the track. By using two separated colour channels, it is possible to display almost all contours that run in different directions, even with motifs that are difficult to capture. These include, for example, italic fonts and letters/characters arranged at a slant.

Whether the colouring of the two light sources is red and green, red and blue, or green and blue is of secondary importance. The choice depends on the railway infrastructure manager, or also on possible specifications and regulations of the legislator. For example, the colour green may be considered critical in the railway industry on a country-specific basis. In this case, a light source with blue light emitted is to be used as an alternative.

In one embodiment of the invention, it is provided that the image information obtained from the subtraction of two colour channels is evaluated, interpreted, and assessed in the computing unit by means of pattern and/or text recognition algorithms, OCR software, or methods of "AI" artificial intelligence, or "CNN" neural networks.

An automated evaluation and assessment of the previously prepared image material enables a versatile use and further use of the information gained during operation along the track. Well-known, proven methods are used here. Motifs with pure text content can be recognized by using OCR "optical character recognition" software, while more complex image motifs such as symbols, special characters, foreign objects, weld seams—to name just a few examples—must be detected using complex procedures. The latter are also interpreted and evaluated with the help of artificial intelligence methods.

In addition, it is provided that the control signal is generated by a controller unit integrated in the camera and output via the control signal lines.

This achieves an efficient use of the components used in the arrangement. Furthermore, an independent unit for control signal generation is not required.

It is also possible that the control signal is generated by the computing unit or a signal generator and output via the control signal lines.

It may be advantageous in certain application scenarios, also depending on the camera type and range of functions, if the control signal is generated externally by a signal generator. This signal generator may be an independent unit coupled with the control signal lines. Another possibility is that the signal generator is integrated as a function module in the computing unit or in the higher-level guidance/control/regulation system. A distance-based control signal, which is generated by a distance measuring wheel, for example, is also possible.

BRIEF DESCRIPTION OF THE DRAWINGS

In the following, the invention is explained by way of example with reference to the accompanying figures. The following figures show in schematic illustrations.

DESCRIPTION OF THE EMBODIMENTS

Figure 1:
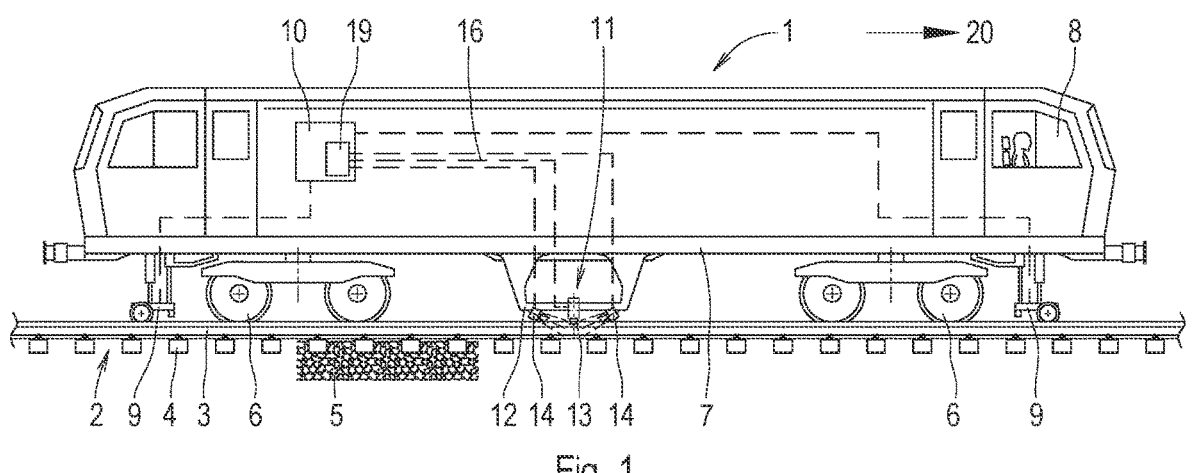
FIG. 1 Side view of a carrier vehicle with an arrangement for optically capturing a track FIG. 2 Cross section of a superstructure with said arrangement FIG. 3 Top view of the illustration from FIG. 2

FIG. 1 shows a schematically illustrated carrier vehicle 1, which is designed as a universally applicable maintenance or track construction machine. In the present application scenario, it is used in its function as a track inspection vehicle to optically capture a track 2. For this purpose, the arrangement 11 according to the invention is attached to a machine frame 7. In other use cases not shown, the arrangement 11 can also be mounted on any desired track construction machine with a corresponding mounting option, such as tamping machines, ballast regulating machines, inspection and crane vehicles. The carrier vehicle 1 is mounted on rail running gears 6 via the machine frame 7 and can be moved on the track 2. The machine frame 7 is, in the simplest case, designed as a longitudinal beam that is mounted on rail running gears 6 at the end. The track 2 comprises rails 3, which are on sleepers 4 embedded in the ballast 5. The often used expression line of rails is to be considered equivalent to the expression rail 3. Furthermore, a guidance/control and regulation system 10 as well as a computing unit 19 is installed in a protected area on the carrier vehicle 1 or in a cab 8. A measuring system 9 arranged in the area of the two ends of the machine frame 7 also captures a current track position.

The arrangement 11 comprises a carrier device 12, a camera 13, and two light sources 14, with the camera 13 and the light sources 14 being arranged on the carrier device 12. The camera 13, the light sources 14, and the computing unit 19 are coupled via control signal lines 16. In addition to transmitting the control signal, these control signal lines 16 also serve to transmit image data. The computing unit 19 is integrated in the higher-level guidance/control/regulation system 10. Alternatively, the computing unit 19 may be installed as a separate, independent unit. A variant of the embodiment also allows a wireless control signal transmission with communicating transmitter and receiver units set up accordingly. The working direction or direction of travel 20 has no relevance for the process of optically capturing the track 2. This is equally possible in both directions.

Figure 2:
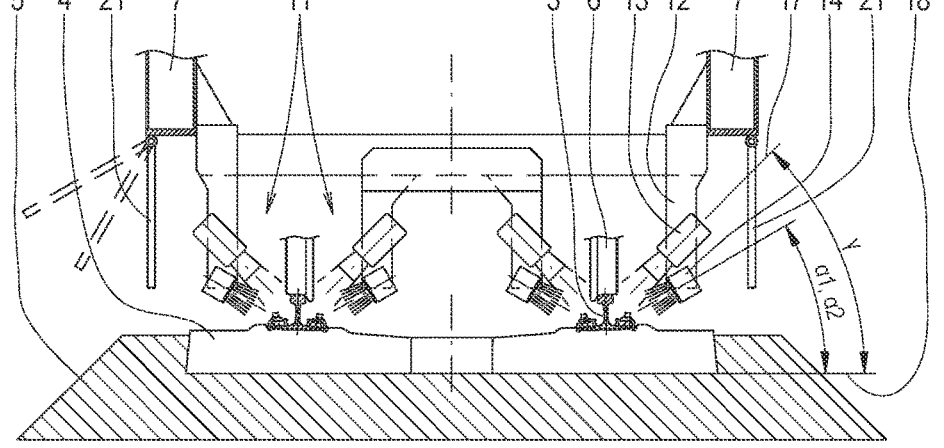

FIG. 2 shows a cross section of the track 2 and a section of the machine frame 7 of the carrier vehicle 1 as well as a quadruple embodiment of the arrangement 11. In the embodiment shown in FIGS. 2 and 3, a total of four arrangements 11 are used to capture the two rails (lines of rails) 3 on both sides. This results in a total application of four cameras 13 and eight light sources 14. For the purpose of better visualization, in FIG. 2 the camera 13 is shown tilted by an angle γ. Usually, the camera 13 and the light sources 14 are arranged one behind the other as viewed in the direction of the longitudinal axis of the rail 15. This means that the camera axis 17, as well as the centre axis of the light sources 14, have approximately the same inclination or angular position in relation to a horizontal subsoil plane 18. Thus, the angles $\alpha 1$, $\alpha 2$ of the two light sources 14 and the angle γ are approximately equal. By design, these angles are usually 35 to 45°. Here, compliance with the usable structure gauge and thus the possible space available for installation is decisive for the arrangement.

The carrier devices 12 of the respective arrangements 11 are attached to the carrier vehicle 1 by means of an additional support structure which is set up between the machine frame 7. In the embodiments shown, the colour filters in front of the camera lens of the camera 13, as well as the colour filters also arranged in front of the light sources 14, are not shown. The device for generating an air curtain, which is to be regarded as belonging to the camera 13, has also been omitted.

Furthermore, in the embodiment in FIG. 2, a mechanical device 21 is set up to shield incident solar radiation. This is arranged below the machine frame 7 and is mounted so that its inclination can be adjusted. The inclination is variably adjustable about an axis lying parallel to the longitudinal axis of the machine frame 7 by a drive not shown. This significantly reduces the incidence of sunlight or other stray light. This device 21 is not shown in the other figures.

Figure 3:
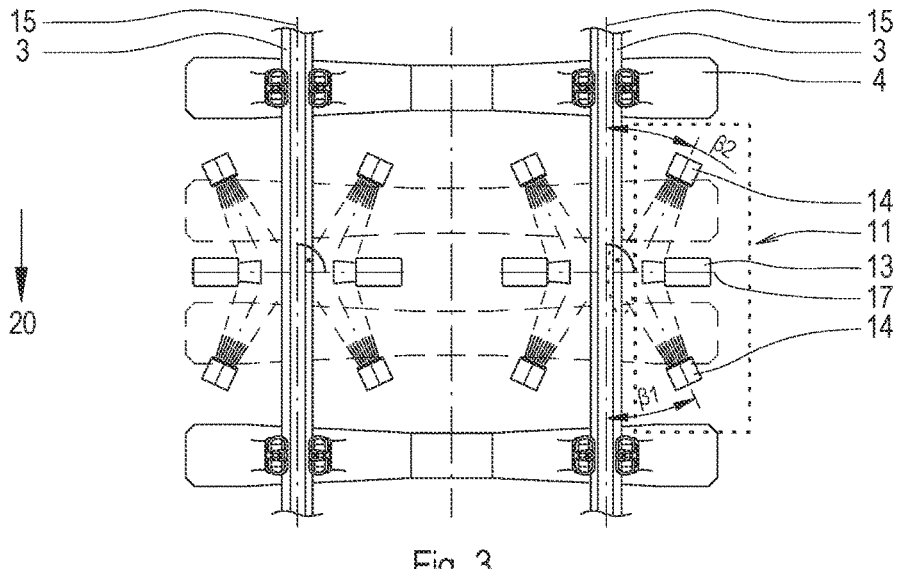

FIG. 3 shows the cross-sectional view from FIG. 2 as a top view. For better differentiation, the outside lying arrangement 11 associated with the right line of rails 3 is highlighted by a dotted, circumferential linear representation. The light sources 14 are arranged in such a way that the associated centre axes with the angles β1 and β2 to the longitudinal axis of the rail 15 enclose an acute angle. These two angles are equal in their amounts in order to obtain an even shadow cast from both sides on the object to be captured. The angles β1 and β2 are usually 10 to 30°, thus ensuring a flat incidence of light with maximum shadow effect.

The invention claimed is:

1. An arrangement for optically capturing a track, the arrangement being attachable on a carrier vehicle that is movable on rails, the arrangement comprising:
   a carrier device, a camera, and two light sources mountable on the carrier vehicle;
   said two light sources and a center axis of a light radiation emitted thereby enclosing an acute angle with a longitudinal axis of a respective rail and an acute angle with a horizontal ground plane;
   wherein said light sources are coupled with said camera via control signal lines, and said light sources are triggered or activated via said control signal lines by way of a predefined control signal; and
   wherein said camera, in a direction of the longitudinal axis of the rail, is arranged substantially centrally between said light sources, with a camera axis being aligned approximately orthogonally to the longitudinal axis of the rail, and said light sources and said camera being disposed and enabled to capture an entire rail contour of the rail.

2. The arrangement according to claim 1, wherein said camera is an RGB video camera with three color channels, namely, red, green, and blue.

3. The arrangement according to claim 1, which further comprises an optical color filter associated with said camera, said optical color filter being configured to only allow a defined range or defined sub-ranges of an optical spectrum or a defined bandwidth of a wavelength range of the incident light to enter optics of said camera.

4. The arrangement according to claim 3, wherein the optical color filter is disposed at a camera lens of said camera.

5. The arrangement according to claim 1, which further comprises a device for generating an air curtain in front of said camera.

6. The arrangement according to claim 1, wherein the air curtain is an area of a uniform airflow in front of said camera.

7. The arrangement according to claim 1, wherein said light sources are LED light sources.

8. The arrangement according to claim 1, wherein each light source has a respectively predefined, fixed wavelength with a corresponding color spectrum.

9. The arrangement according to claim 1, which further comprises a computing unit with an integrated internal memory coupled to said camera.

10. A method for optically capturing a track, the method comprising:
    providing an arrangement according to claim 1;
    activating the camera and the light sources at a beginning of a work process, by triggering the light sources synchronously by way of the control signal, and, simultaneously capturing a track point by the camera, and recording image data obtained by the camera by a computing unit.

11. The method according to claim 10, which comprises storing the image data acquired by the computing unit in a buffer memory for later or time-delayed use, or the image data are read in directly by the computing unit for further processing.

12. The method according to claim 10, which comprises separating raw image data acquired by the camera and read into the computing unit into individual color channels, and subtracting the image data or image information contained in two color channels from each other.

13. The method according to claim 12, which comprises subtracting the color channels red and green, or the color channels red and blue, from each other.

14. The method according to claim 12, which comprises evaluating, interpreting, and assessing image information obtained by subtracting the two color channels in the computing unit by at least one process selected from the group consisting of pattern recognition algorithms, text recognition algorithms, optical character recognition software processing, methods of artificial intelligence, and neural network processing.

15. The method according to claim 10, which comprises generating the control signal by a controller unit integrated in the camera and outputting the control signal via the control signal lines.

16. The method according to claim 10, which comprises generating the control signal by the computing unit or a signal generator and outputting the control signal via the control signal lines.

*    *    *    *    *